US012343992B2

(12) United States Patent
Shingyoh et al.

(10) Patent No.: US 12,343,992 B2
(45) Date of Patent: Jul. 1, 2025

(54) LIQUID DISCHARGE HEAD, LIQUID DISCHARGE DEVICE, AND LIQUID DISCHARGE APPARATUS

(71) Applicants: Masaya Shingyoh, Kanagawa (JP); Ryuji Tsukamoto, Kanagawa (JP); Kohta Akiyama, Kanagawa (JP)

(72) Inventors: Masaya Shingyoh, Kanagawa (JP); Ryuji Tsukamoto, Kanagawa (JP); Kohta Akiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 384 days.

(21) Appl. No.: 17/869,811

(22) Filed: Jul. 21, 2022

(65) Prior Publication Data

US 2023/0241890 A1 Aug. 3, 2023

(30) Foreign Application Priority Data

Jul. 28, 2021 (JP) ................................ 2021-123014

(51) Int. Cl.
*B41J 2/14* (2006.01)
*B41J 2/175* (2006.01)

(52) U.S. Cl.
CPC .......... *B41J 2/14233* (2013.01); *B41J 2/175* (2013.01); *B41J 2002/14266* (2013.01)

(58) Field of Classification Search
CPC ................... B41J 2/14233; B41J 2/175; B41J 2002/1437; B41J 2202/15; B41J 2002/14266
See application file for complete search history.

(56) References Cited

U.S. PATENT DOCUMENTS

| | | | | |
|---|---|---|---|---|
| 10,343,400 | B2 * | 7/2019 | Sugai | B41J 2/14274 |
| 11,090,925 | B2 * | 8/2021 | Kusunoki | B41J 2/14233 |
| 11,110,707 | B2 * | 9/2021 | Mizuno | B41J 2/1433 |
| 11,400,710 | B2 * | 8/2022 | McAvoy | B41J 2/14233 |
| 2013/0215173 | A1 | 8/2013 | Akiyama | |
| 2019/0299597 | A1 | 10/2019 | Tsukamoto | |
| 2022/0032614 | A1 | 2/2022 | Akiyama | |
| 2022/0143975 | A1 | 5/2022 | Akiyama | |

FOREIGN PATENT DOCUMENTS

| | | | |
|---|---|---|---|
| JP | H06-115070 | A | 4/1994 |
| JP | 2001-322271 | | 11/2001 |
| JP | 2002-359981 | A | 12/2002 |
| JP | 2006-096034 | A | 4/2006 |
| JP | 2008-198959 | A | 8/2008 |
| JP | 2015-196145 | | 11/2015 |
| JP | 2016-052723 | | 4/2016 |

OTHER PUBLICATIONS

Office Action issued Mar. 5, 2025 in Japanese Patent Application No. 2021-123014, 9 pages.

* cited by examiner

*Primary Examiner* — An H Do
(74) *Attorney, Agent, or Firm* — XSENSUS LLP

(57) ABSTRACT

A liquid discharge head includes: a diaphragm having a nozzle; a substrate including a pressure chamber communicating with the nozzle; a piezoelectric body over the diaphragm, the piezoelectric body configured to deform at least a part of an edge of the nozzle; and a vibration absorbing portion in the diaphragm.

19 Claims, 6 Drawing Sheets

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119 (a) to Japanese Patent Application No. 2021-123014, filed on Jul. 28, 2021, in the Japan Patent Office, the entire disclosure of which is hereby incorporated by reference herein.

BACKGROUND

Technical Field

Aspects of the present disclosure relate to a liquid discharge head, a liquid discharge device, and a liquid discharge apparatus.

Related Art

An inkjet head includes a diaphragm having a nozzle. An inkjet head drives a piezoelectric body to discharge a liquid. The piezoelectric body is disposed in a periphery of the nozzles.

However, the piezoelectric body driven generates vibration that transmits to the diaphragm and affects a discharge operation of other nozzles in the inkjet head. The vibration may cause a problem such as crosstalk and reducing discharge productivity. A normal image may not be obtained by the crosstalk.

SUMMARY

A liquid discharge head includes: a diaphragm having a nozzle; a substrate including a pressure chamber communicating with the nozzle; a piezoelectric body over the diaphragm, the piezoelectric body configured to deform at least a part of an edge of the nozzle; and a vibration absorbing portion in the diaphragm.

A liquid discharge head includes: a diaphragm having a nozzle; a substrate bonded to the diaphragm with adhesive, the substrate including a pressure chamber communicating with the nozzle; a piezoelectric body over the diaphragm, the piezoelectric body configured to deform at least a part of an edge of the nozzle; and a vibration absorbing portion between the diaphragm and the substrate, the vibration absorbing portion being a void space.

A liquid discharge device includes the liquid discharge head.

A liquid discharge apparatus comprising the liquid discharge device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
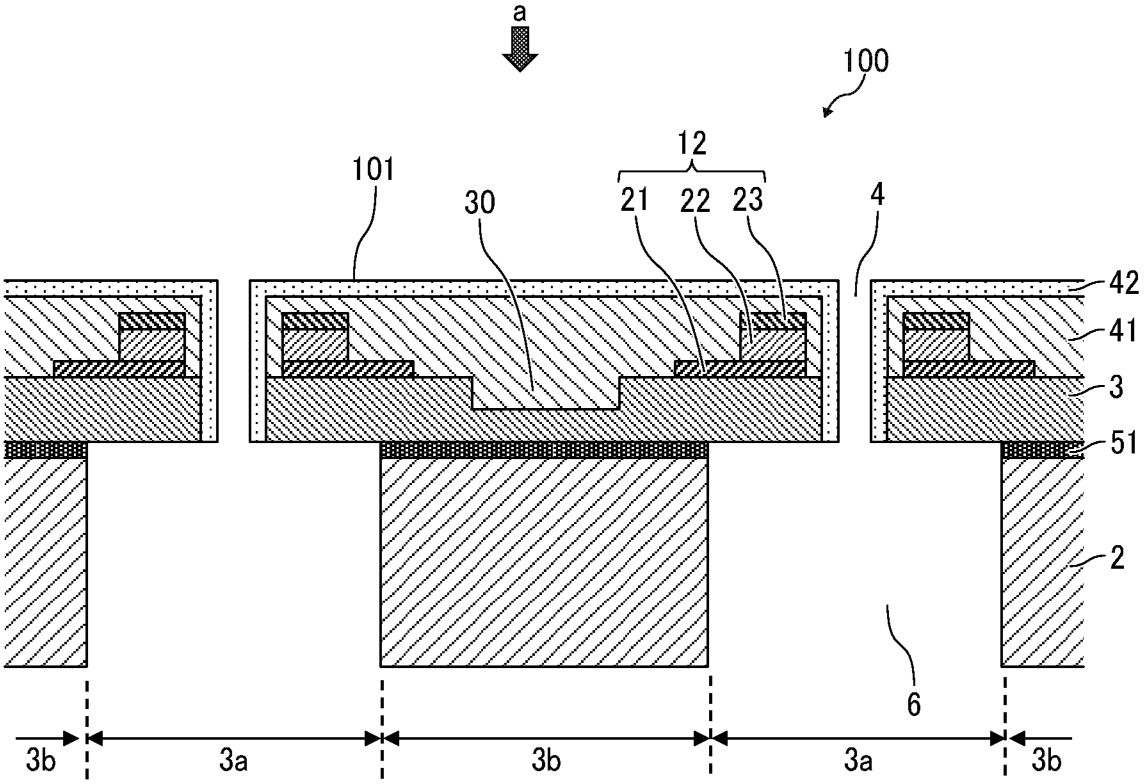
FIG. 1 is a schematic cross-sectional view of the liquid discharge head according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

It will also be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements present. Referring now to the drawings, wherein like reference numerals designate identical or corresponding parts throughout the several views, embodiments of the present disclosure are described below.

Hereinafter, a liquid discharge head, a liquid discharge device, and a liquid discharge apparatus according to a present disclosure is described below with reference to the drawings. Note that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are demonstrated.

A liquid discharge head 100 according to the present disclosure includes a diaphragm 3 having a nozzle 4; a substrate 2 forming a pressure chamber 6 communicating with the nozzle 4; and a piezoelectric body 22 formed on the diaphragm 3 and deforming at least a part of an edge (periphery) of the nozzle 4. The diaphragm 3 includes a vibration absorbing portion 30. Hereinafter, the liquid discharge head 100 is simply referred to as a "head 100". The diaphragm 3 is also referred to as a "vibration plate".

First Embodiment

FIG. 1 is a schematic cross-sectional view of the head 100 according to the first embodiment of the present disclosure. As illustrated in FIG. 1, the head 100 includes a substrate 2, a diaphragm 3, a nozzle 4, a pressure chamber 6, a piezoelectric body 22, and the like. The head 100 may include a drive circuit, an electrode pad, and the like as desired. The diaphragm 3 has the nozzle 4. The diaphragm 3 may form a part of the nozzle 4. A surface of the head 100 on which the nozzle is formed is referred to as a nozzle surface 101. The substrate 2 includes a pressure chamber 6 communicating with the nozzle 4. In other words, the substrate 2 may form a part of the pressure chamber 6. The head 100 in this first embodiment includes the diaphragm 3 and the substrate 2 bonded to each other with an adhesive 51.

The piezoelectric body 22 is formed on the diaphragm 3 and deforms at least a part of the edge (periphery) of the nozzle 4. The head 100 in the first embodiment includes a lower electrode 21 formed below the piezoelectric body 22, and an upper electrode 23 formed above the piezoelectric body 22. A configuration including the lower electrode 21, the piezoelectric body 22, and the upper electrode 23 may be referred to as a piezoelectric element, a piezoelectric actuator, a driver, a pressure generator, or the like. In the following description, the configuration including the lower electrode 21, the piezoelectric body 22, and the upper electrode 23 is referred to as a piezoelectric element 12.

The head 100 in the first embodiment includes a protective layer 41 that is formed to cover the piezoelectric element 12 and a water-resistant film 42 that is formed to cover the protective layer 41. The head 100 arbitrary includes the protective layer 41 and the water-resistant film 42, and the protective layer 41 and the water-resistant film 42 may be appropriately selected to be formed in the head 100. However, it is preferable to provide the protective layer 41 and the water-resistant film 42 in the head 100 from the viewpoint of preventing deterioration of the piezoelectric element 12.

The head 100 according to the first embodiment drives the piezoelectric elements 12 arranged in the vicinity of nozzles 4 to discharge a liquid. In such a head, there is a demand for a technique capable of reducing transmission of vibration generated by a piezoelectric body to other nozzles. However, the head in a comparative example may not sufficiently reduce transmission of the vibration generated by the piezoelectric body to other nozzles 4. For example, a gap may be provided between a side surface of the protective film on a drive element side and an outer peripheral portion of the drive element in the head in the comparative example. However, the head in the comparative example does not include a mechanism for preventing propagation of vibration to other nozzles in the diaphragm. Since the diaphragm itself is driven to discharge the liquid (for example, ink), the vibration plate itself easily propagates the vibration. Thus, it is important for the head to include a mechanism for preventing propagation of vibration in the nozzle plate (diaphragm).

The head 100 in the first embodiment includes a vibration absorbing portion 30 in the diaphragm 3 as illustrated in FIG. 1. The head 100 discharges a liquid by driving the piezoelectric element arranged in the vicinity of the nozzle. The head 100 includes the vibration absorbing portion 30 in the diaphragm 3 itself, so that the head 100 can reduce propagation of vibration to other nozzles via the diaphragm 3 when the piezoelectric element is driven.

Further, the head 100 can reduce propagation of the vibration to the other nozzles to reduce influence of the propagation of the vibration on a discharge properties of the other nozzles according to the first embodiment. Thus, the head 100 can reduce an occurrence of an abnormal image due to crosstalk or the like.

In the illustrated example as illustrated in FIG. 1, a thickness of the diaphragm 3 is reduced (thinned) to form the vibration absorbing portion 30. The thickness of the vibration absorbing portion 30 is made thinner (smaller) than a thickness of a portion around the vibration absorbing portion 30 so that the head 100 can reduce rigidity of the vibration absorbing portion 30 and increase an effect of absorbing the vibration. How thin the thickness of the diaphragm 3 is to be formed (thinned) is appropriately selected.

In FIG. 1, the diaphragm 3 may be divided into a first diaphragm portion **3*a* and a second diaphragm portion 3*b*. The first diaphragm portion 3*a* is a portion of the diaphragm 3 that is not bonded to the substrate 2 and faces the pressure chamber 6. The first diaphragm portion 3*a* has nozzle 4. The second diaphragm portion 3*b* is a portion of the diaphragm 3 that is bonded to the substrate 2 and does not face the pressure chamber 6**.

The thickness of a predetermined portion of the diaphragm 3 is reduced (thinned) in advance to form the vibration absorbing portion 30, and then the diaphragm 3 and the substrate 2 are bonded to each other to manufacture the head 100 according to the first embodiment, although a manufacturing method of the head is not particularly limited the method as described above. Alternatively, after the diaphragm 3 and the substrate 2 are bonded to each other, the thickness of a predetermined portion of the diaphragm 3 may be reduced (thinned) to form the vibration absorbing portion 30. The thickness of the diaphragm 3 is reduced (thinned) by, for example, etching.

Figure 2:
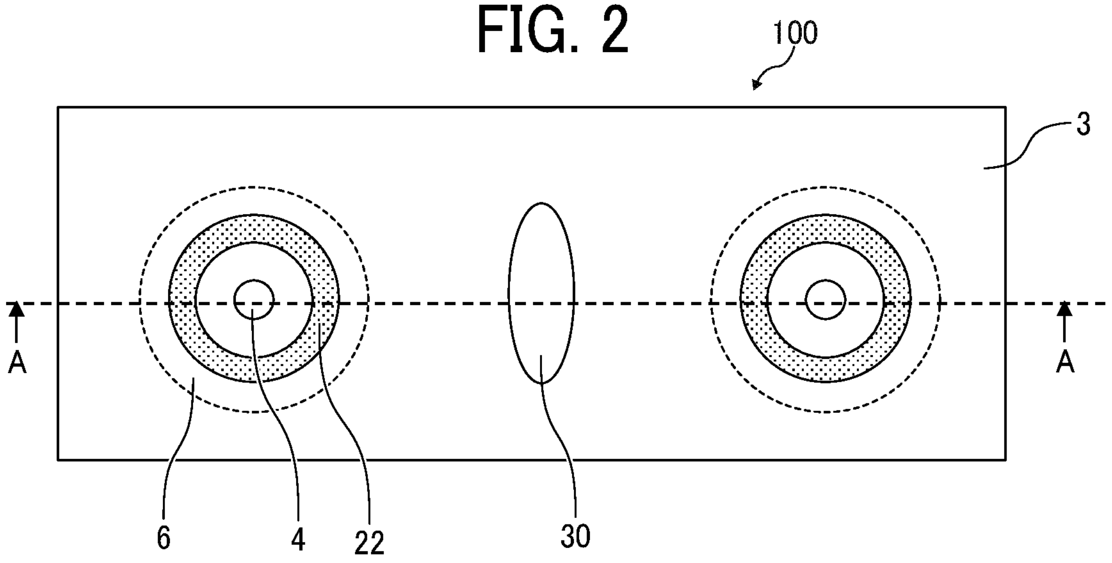
FIG. 2 is a schematic plan view of the liquid discharge head according to the first embodiment of the present disclosure.

FIG. 2 is a schematic plan view of a main portion of the head 100 according to the first embodiment, as viewed in a direction indicated by arrow "a" in FIG. 1.

FIG. 2 may also be referred to as a schematic plan view of a main portion of the head 100 when the head 100 is viewed from a direction orthogonal to a surface (plane) direction of the diaphragm 3. A cross section taken along line "A-A" in FIG. 2 corresponds to FIG. 1.

The head 100 in the first embodiment preferably includes the vibration absorbing portion 30 in a region of the diaphragm 3 at which the pressure chamber 6 is not formed when the head 100 is viewed from the direction orthogonal to the surface (plane) direction of the diaphragm 3. Since the second diaphragm portion **3*b* of the diaphragm 3 bonded to the substrate 2 has higher rigidity than the first diaphragm portion 3*a* of the diaphragm 3, the vibration at the second diaphragm portion 3*b* is not easily attenuated. Therefore, as illustrated in FIG. 2, the vibration absorbing portion 30 is formed in the region at which the pressure chamber 6 is not formed so that the head 100** can effectively attenuate the vibration.

In this example, the region at which the pressure chamber 6 is not formed is substantially the same as a region at which the diaphragm 3 and the substrate 2 are bonded to each other. However, the region at which the pressure chamber 6 is not formed may be different from the region at which the diaphragm 3 and the substrate 2 are bonded to each other.

The vibration absorbing portion 30 may be provided in a region of the diaphragm 3 at which the pressure chamber 6 is formed when a head is viewed from the direction orthogonal to the surface (plane) direction of the diaphragm 3. However, the vibration absorbing portion 30 formed in such a region (the region of the diaphragm 3 at which the pressure chamber 6 is formed) has a smaller effect of absorbing vibration than the above-described configuration.

In FIG. 2, the vibration absorbing portion 30 has an elliptical shape. However, the vibration absorbing portion 30 in the first embodiment is not limited to a configuration as described above such as the elliptical shape.

A planer shape of the vibration absorbing portion 30 may be appropriately changed. For example, the vibration absorbing portion 30 may have a rectangular shape. The head 100 in this example includes one vibration absorbing portion 30 between the adjacent nozzles 4. However, the head 100 may include multiple vibration absorbing portions 30 between adjacent nozzles 4.

As illustrated by a broken line "A-A" in FIG. 2, the head 100 preferably includes the vibration absorbing portion 30 on a line connecting the nozzles 4. The same applies to other embodiments.

A shape and a position of the piezoelectric body 22 may be appropriately selected. The head 100 in the first embodiment includes the piezoelectric body 22 on a surface of the diaphragm 3 opposite to a surface of the diaphragm 3 bonded to the substrate 2. Further, the piezoelectric body 22 preferably has a shape of a ring (doughnut) around the nozzle 4 in a region at which the pressure chamber 6 is formed when the head 100 is viewed from the direction orthogonal to the surface (plane) direction of the diaphragm 3.

Second Embodiment

Next, the head 100 according to a second embodiment according to the present disclosure is described below. Redundant descriptions of the same matters as those described above may be omitted below.

Figure 3:
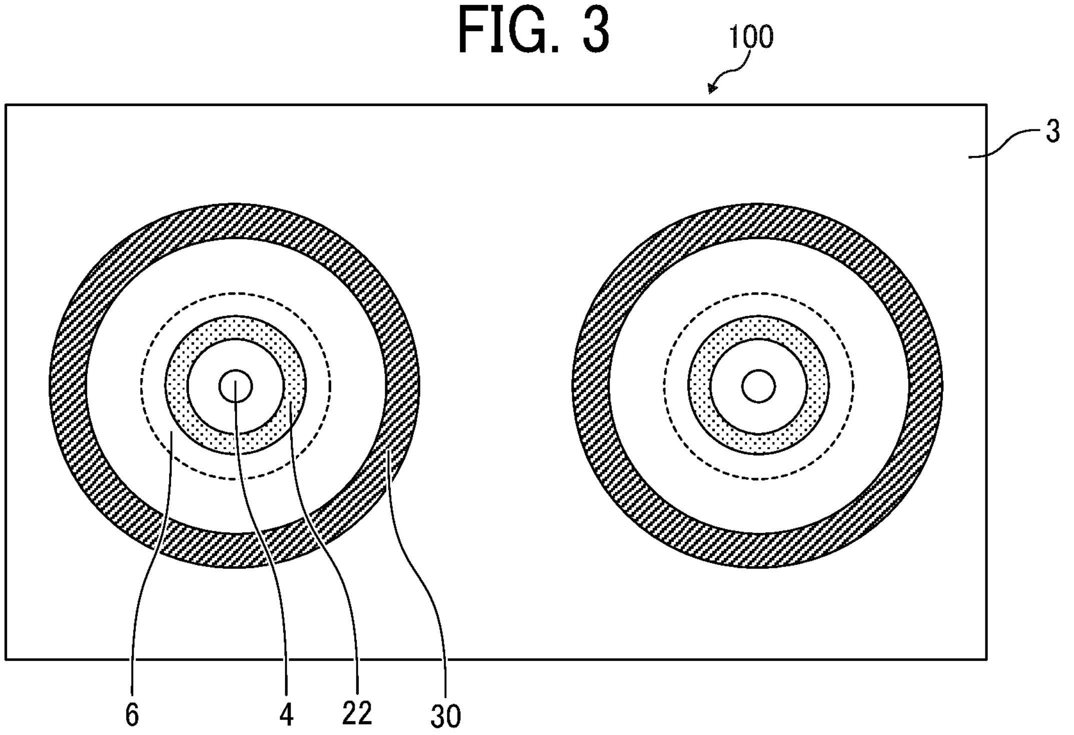
FIG. 3 is a schematic plan view of the liquid discharge head according to a second embodiment of the present disclosure.

FIG. 3 is a schematic plan view of the head 100 according to a second embodiment of the present disclosure. As similar to FIG. 2, FIG. 3 is the schematic plan view of the head 100 when the head 100 is viewed from the direction orthogonal to the surface (plane) direction of the diaphragm 3.

The head 100 in the second embodiment includes the vibration absorbing portion 30 having a ring (doughnut) shape around the nozzle 4 when the head 100 is viewed from the direction orthogonal to the surface (plane) direction of the diaphragm 3. The head 100 includes the vibration absorbing portion 30 having the ring (doughnut) shape in the above manner so that the head 100 can receive the vibration from the nozzle 4 in all directions by the vibration absorbing portion 30. Thus, the head 100 according to the second embodiment can further reduce propagation of the vibration to other nozzles 4. Thus, the vibration absorbing portion 30 has a shape of a ring around the nozzle 4 in a plan view of the diaphragm 3.

Thus, the vibration absorbing portion 30 is concentrically disposed outside the piezoelectric body 22 in a plan view of the diaphragm 3.

Similarly to the above-described embodiment, the head 100 according to the second embodiment includes the vibration absorbing portion 30 in a region at which the pressure chamber 6 is not formed when the head 100 is viewed from the direction orthogonal to the surface (plane) direction of the diaphragm 3. Thus, the head 100 in the second embodiment can further attenuate the vibration from the nozzles 4.

Third Embodiment

Next, the head 100 according to a third embodiment according to the present disclosure is described below. Redundant descriptions of the same matters as those described above may be omitted below.

Figure 4:
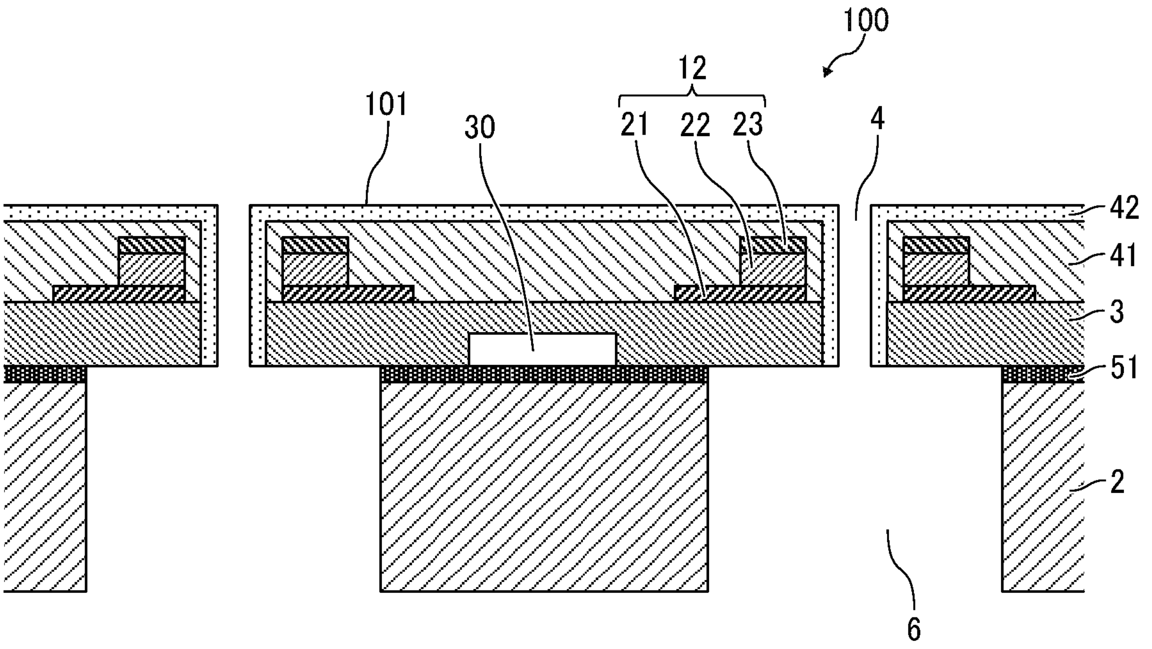
FIG. 4 is a schematic cross-sectional view of the liquid discharge bead according to a third embodiment of the present disclosure.

FIG. 4 is a schematic cross-sectional view of the head 100 according the third embodiment of the present disclosure similar to FIG. 1. The head 100 according to the third embodiment includes the vibration absorbing portion 30 having a thickness smaller (thinner) than thickness of other portions of the diaphragm 3 as similar to the head 100 in the first embodiment as illustrated in FIG. 1. However, a direction of a reduction of the thickness of the vibration absorbing portion 30 in the third embodiment is different from a direction of a reduction of the thickness of the vibration absorbing portion 30 in each of the above-described embodiments.

In the head 100 according to the first embodiment, the vibration absorbing portion 30 is formed by the diaphragm 3, a part of which has a shape recessed downward toward the substrate 2 as illustrated in FIG. 1. In FIG. 1, the vibration absorbing portion 30 is formed in an upper portion of the second diaphragm portion **3*b* of the diaphragm 3. In other words, the vibration absorbing portion 30 in the first embodiment is formed by reducing (thinning) the thickness of the diaphragm 3 such that a depth of the diaphragm 3 increases toward the substrate 2 to form the vibration absorbing portion 30**.

Conversely, in the head 100 according to the third embodiment, the vibration absorbing portion 30 is formed by the diaphragm 3, a part of which has a shape recessed upward toward the nozzle surface 101 as illustrated in FIG. 4. That is, the vibration absorbing portion 30 is formed by the diaphragm 3, a part of which has a shape recessed in a direction opposite to the substrate 2 (upward direction) as illustrated in FIG. 4.

In FIG. 4, the vibration absorbing portion 30 is formed in a lower (bottom) portion of the second diaphragm portion **3*b* of the diaphragm 3. In other words, the vibration absorbing portion 30 in the third embodiment is formed by reducing the thickness of the diaphragm 3 such that a depth of the diaphragm 3 increases toward the nozzle surface 101 to form the vibration absorbing portion 30**.

Also in the head 100 according to the third embodiment, the thickness of the vibration absorbing portion 30 is made thinner (smaller) than a thickness of portions surrounding the vibration absorbing portion 30 to reduce rigidity of the diaphragm 3 to obtain an effect of absorbing the vibration. Therefore, not only the configuration illustrated in FIG. 1, but a configuration such as this third embodiment illustrated in FIG. 4 is also possible to reduce the thickness of the diaphragm 3 to form the vibration absorbing portion 30. Further, a planar shape of the vibration absorbing portion 30 in the third embodiment may be made the same as a planer shape of the vibration absorbing portion 30 of the first embodiment illustrated in FIG. 2. The planar shape of the vibration absorbing portion 30 in the third embodiment is not limited to the embodiments described above, and may be appropriately changed.

The thickness of a predetermined portion of the diaphragm 3 is reduced (thinned) in advance to form the vibration absorbing portion 30, and then the diaphragm 3 and the substrate 2 are bonded to each other to manufacture the head 100 according to the third embodiment, although a manufacturing method of the head 100 is not particularly limited to the methods as described above.

Fourth Embodiment

Next, the head 100 according to a fourth embodiment according to the present disclosure is described below. Redundant descriptions of the same matters as those described above may be omitted below.

Figure 5:
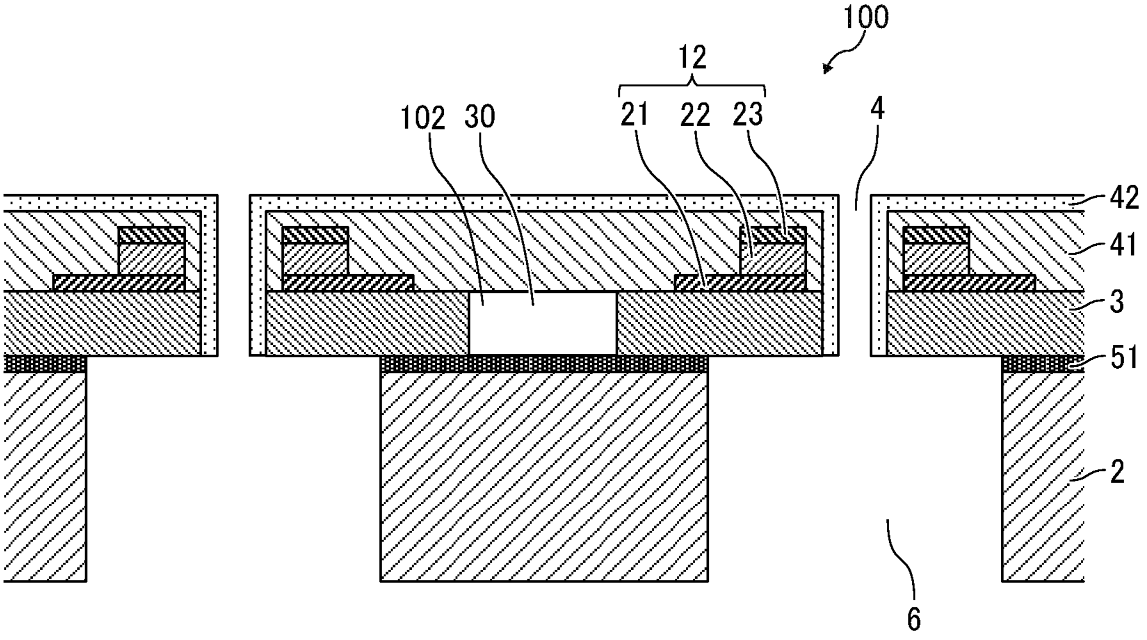
FIG. 5 is a schematic cross-sectional view of the liquid discharge head according to a fourth embodiment of the present disclosure.

FIG. 5 is a schematic cross-sectional view of the head 100 according to the fourth embodiment, which is similar to FIG. 1. In the head 100 according to fourth embodiment, a hole 102 is formed in the diaphragm 3 to form the vibration absorbing portion 30 in the diaphragm 3. The hole 102 penetrates through the diaphragm 3.

The hole 102 is formed in the diaphragm 3 to obtain an effect of blocking propagation of vibration in the diaphragm 3.

The hole 102 is formed in a predetermined portion of the diaphragm 3, and then the diaphragm 3 and the substrate 2 are bonded to each other to manufacture the head 100 according to the fourth embodiment, although a manufacturing method of the head 100 is not particularly limited to the methods as described above. Alternatively, the thickness of a predetermined portion of the diaphragm 3 may be reduced (thinned) to form the vibration absorbing portion 30 after the diaphragm 3 and the substrate 2 are bonded to each other.

A number of the vibration absorbing portions 30 may be appropriately selected, and may be one or more (multiple numbers). Further, a planar shape of the vibration absorbing portion 30 in the third embodiment may be made the same as a planer shape of the vibration absorbing portion 30 of the first embodiment illustrated in FIG. 2. The planar shape of the vibration absorbing portion 30 in the fourth embodiment is not limited to the embodiments described above, and may be appropriately changed.

Fifth Embodiment

Next, the head 100 according to a fifth embodiment according to the present disclosure is described below. Redundant descriptions of the same matters as those described above may be omitted below.

Figure 6:
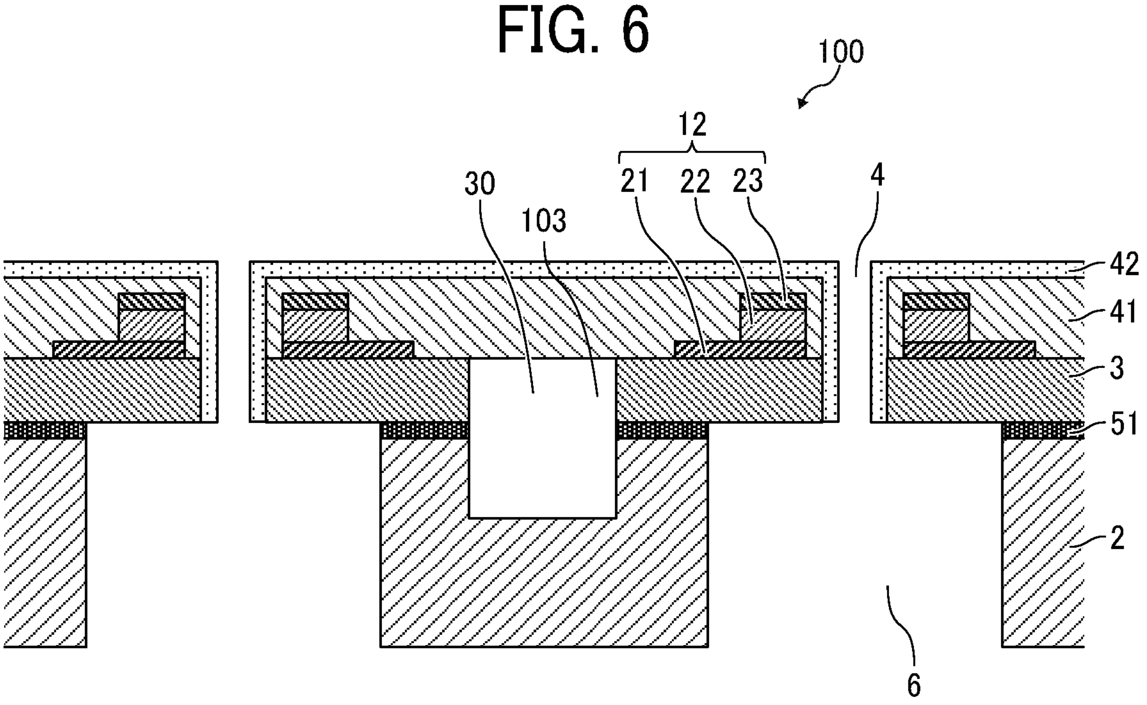
FIG. 6 is a schematic cross-sectional view of the liquid discharge head according to a fifth embodiment of the present disclosure.

FIG. 6 is a schematic cross-sectional view of the head 100 according to the fifth embodiment, which is similar to FIG. 1. The head 100 according to the fifth embodiment includes the vibration absorbing portion 30 having a hole 103 formed in the second diaphragm portion 3*b* of the diaphragm 3 as similar to the head 100 in the fourth embodiment as illustrated in FIG. 5. The hole 103 penetrates through the diaphragm 3.

Further, the head 100 in the fifth embodiment includes the substrate 2, a thickness of which at a portion facing the vibration absorbing portion 30 is thinner (smaller) than a thickness at a portion of the substrate 2 not facing the vibration absorbing portion 30. Accordingly, the head 100 according to the fifth embodiment can further reduce the rigidity of the diaphragm 3 around the vibration absorbing portion 30 to reduce propagation of the vibration.

The hole 103 is formed in a predetermined portion of the diaphragm 3 in advance, and then a predetermined portion of the substrate 2 is thinned. Then, the diaphragm 3 and the substrate 2 are bonded to each other to manufacture the head 100 according to the fifth embodiment, although a manufacturing method of the head 100 is not particularly limited to the methods as described above. Alternatively, the thickness of a predetermined portion of the diaphragm 3 may be reduced (thinned) while the hole 103 is formed in the predetermined portion of the diaphragm 3 to form the vibration absorbing portion 30 after the diaphragm 3 and the substrate 2 are bonded to each other. The thickness of the substrate 2 is reduced by, for example, etching.

Sixth Embodiment

Next, the head 100 according to a fifth embodiment according to the present disclosure is described below. Redundant descriptions of the same matters as those described above may be omitted below.

Figure 7:
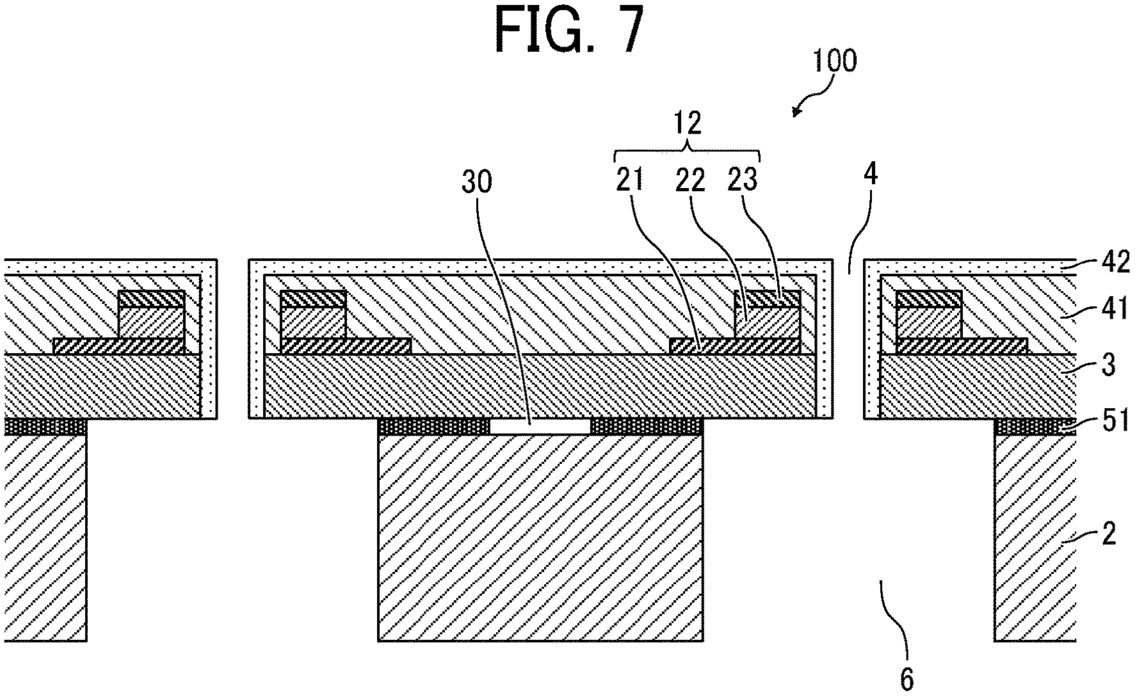
FIG. 7 is a schematic cross-sectional view of the liquid discharge head according to a sixth embodiment of the present disclosure.

FIG. 7 is a schematic cross-sectional view of the head 100 according to the sixth embodiment, which is similar to FIG. 1. The head 100 in the sixth embodiment includes the diaphragm 3 and the substrate 2 bonded to each other with an adhesive 51. The vibration absorbing portion 30 is a void space in which the adhesive 51 is not provided between the diaphragm 3 and the substrate 2.

A rigidity decreases in a region in which the adhesive 51 is not applied. Thus, the vibration absorbing portion 30 can absorb the vibration from the nozzle 4 in a region in which the adhesive 51 is not applied.

[Liquid Discharge Apparatus and Liquid Discharge Device]

Next, an example of the liquid discharge apparatus 1000 according to the present disclosure is described with reference to FIGS. 8 and 9.

Figure 8:
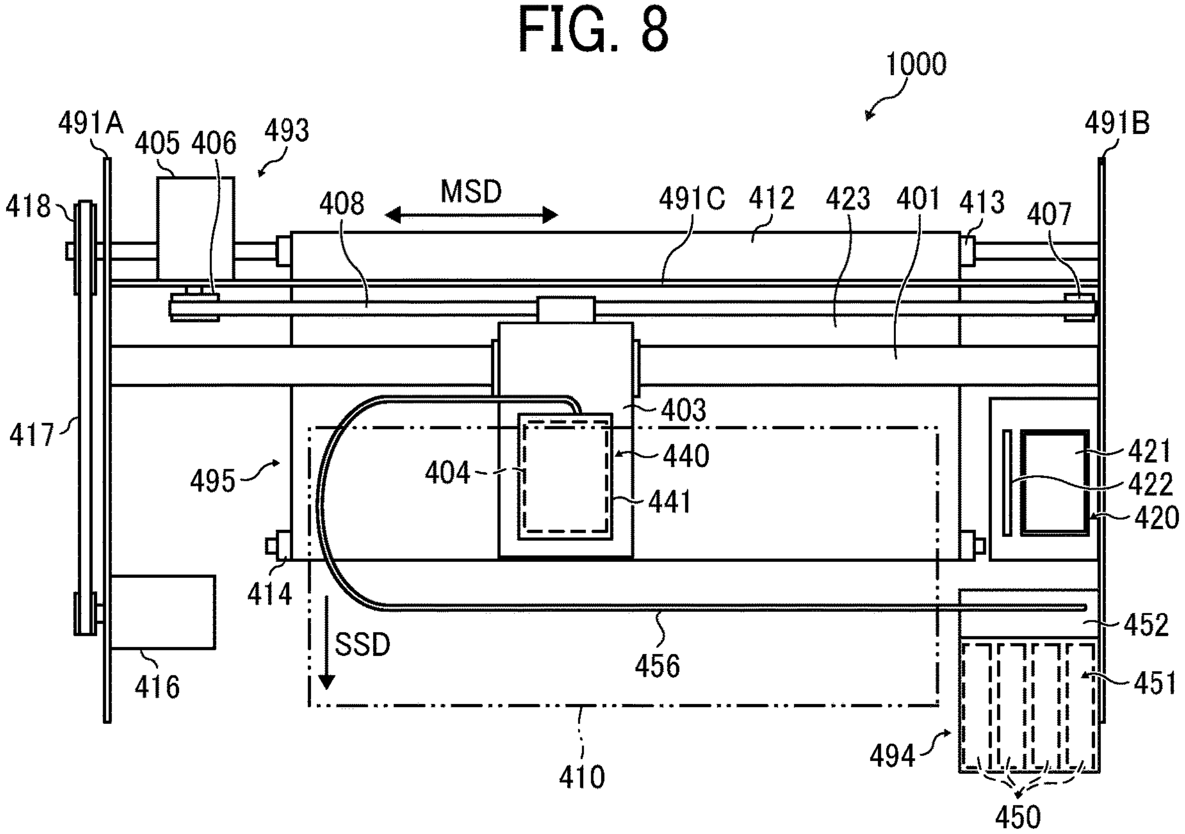
FIG. 8 is a schematic plan view of a liquid discharge apparatus according to an embodiment of the present disclosure.

FIG. 8 is a plan view of a part of the liquid discharge apparatus 1000.

Figure 9:
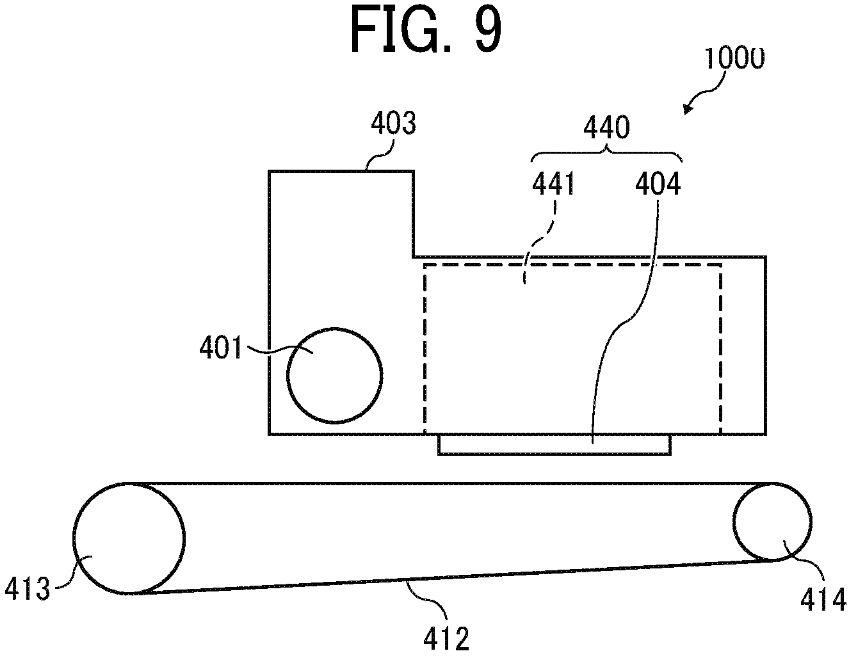
FIG. 9 is a side view of a portion of the liquid discharge apparatus 1000 of FIG. 8.

FIG. 9 is a side view of a portion of the liquid discharge apparatus 1000 of FIG. 8.

The liquid discharge apparatus 1000 is a serial type apparatus, and the carriage 403 reciprocally moves in the main scanning direction MSD by the main scan moving unit 493. The main scan moving unit 493 includes a guide 401, a main scan motor 405, a timing belt 408, and the like. The guide 401 is bridged between a left-side plate 491A and a right-side plate 491B to moveably hold the carriage 403. The main scan motor 405 reciprocally moves the carriage 403 in the main scanning direction MSD via the timing belt 408 bridged between a drive pulley 406 and a driven pulley 407.

The carriage 403 mounts the liquid discharge device 440. The head 404 (head) according to the above-described embodiments of the present disclosure and the head tank 441 form the liquid discharge device 440 as a single unit. The head 404 of the liquid discharge device 440 discharges liquid of each color, for example, yellow (Y), cyan (C), magenta (M), and black (K). The head 404 includes a nozzle array including multiple nozzles 4 arrayed in row in a sub-scanning direction indicated by arrow "SSD" in FIG. 8. The head 404 is mounted to the carriage 403 so that ink droplets are discharged downward. The sub-scanning direction SSD is orthogonal to the main scanning direction MSD.

The liquids stored in liquid cartridges 450 are supplied to the head tank 441 by a supply unit 494 to supply the liquids stored outside the head 404 to the head 404.

The supply unit 494 includes a cartridge holder 451 serving as a filling part to mount the liquid cartridges 450, a tube 456, a liquid feeder 452 including a liquid feed pump, and the like. The liquid cartridge 450 is detachably attached to the cartridge holder 451. The liquid is fed from the liquid cartridge 450 to the head tank 441 by the liquid feeder 452 via the tube 456.

The liquid discharge apparatus 1000 includes a conveyor 495 to convey a sheet 410. The conveyor 495 includes a conveyance belt 412 as a conveyor and a sub scan motor 416 to drive the conveyance belt 412.

The conveyance belt 412 attracts the sheet 410 and conveys the sheet 410 at a position facing the head 404. The conveyance belt 412 is an endless belt stretched between a conveyance roller 413 and a tension roller 414. Attraction of the sheet 410 to the conveyance belt 412 may be applied by electrostatic adsorption, air suction, or the like.

The conveyance belt 412 rotates in the sub scanning direction SSD as the conveyance roller 413 is rotationally driven by the sub scan motor 416 via the timing belt 417 and the timing pulley 418.

At one side in the main scanning direction MSD of the carriage 403, a maintenance unit 420 to maintain the head 404 in good condition is disposed on a lateral side of the conveyance belt 412.

The maintenance unit 420 includes, for example, a cap 421 to cap a nozzle surface of the head 404, a wiper 422 to wipe the nozzle surface, and the like. The nozzle surface is an outer surface of the diaphragm 3 (see FIGS. 1 to 3) on which the nozzles 4 are formed.

The main scan moving unit 493, the supply unit 494, the maintenance unit 420, and the conveyor 495 are mounted to a housing that includes a left-side plate 491A, a right-side plate 491B, and a rear-side plate 491C.

In the liquid discharge apparatus 1000 thus configured, the sheet 410 is conveyed on and attracted to the conveyance belt 412 and is conveyed in the sub scanning direction SSD by the cyclic rotation of the conveyance belt 412.

The head 404 is driven in response to image signals while the carriage 403 moves in the main scanning direction MSD, to discharge a liquid to the sheet 410 stopped, thus forming an image on the sheet 410.

As described above, the liquid discharge apparatus 1000 includes the head 404 according to the above-described embodiments of the present disclosure, thus allowing stable formation of high quality images.

Next, the liquid discharge device 440 according to another embodiment of the present disclosure is described with reference to FIG. 10.

Figure 10:
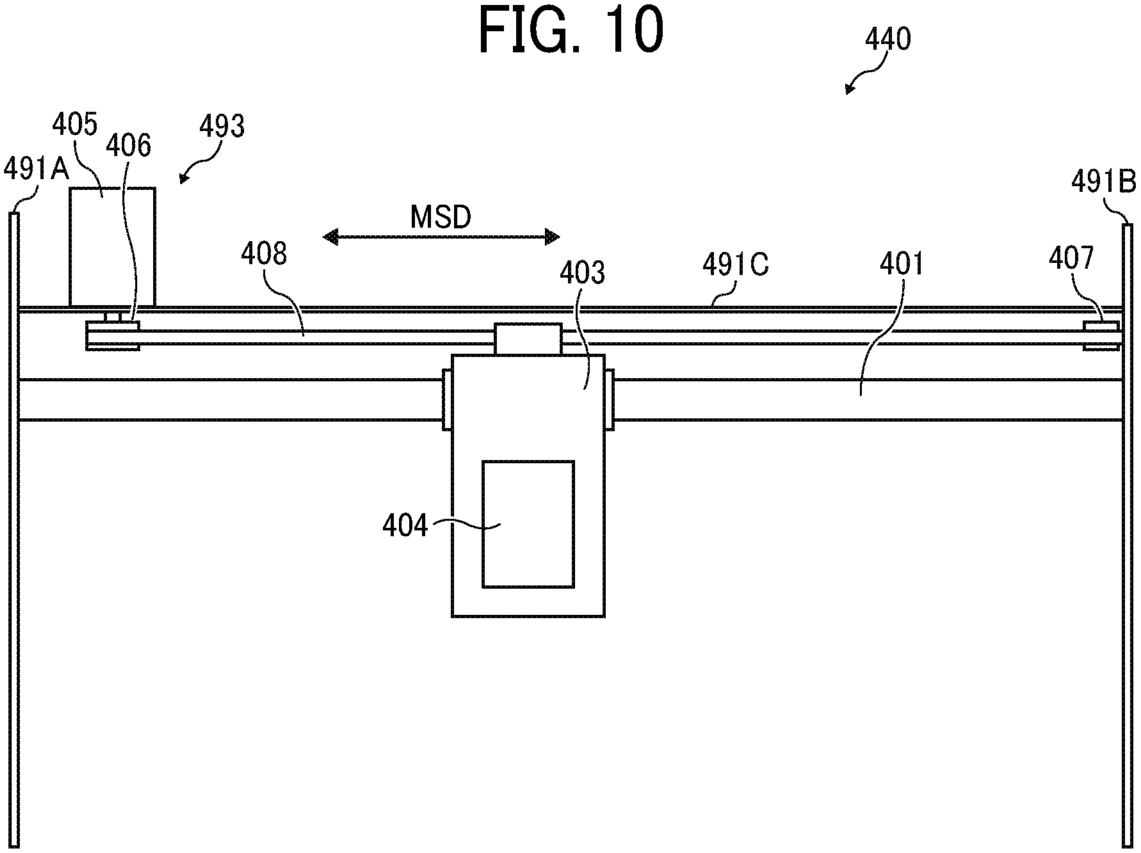
FIG. 10 is a schematic view of an example of a liquid discharge device according to an embodiment of the present disclosure.

FIG. 10 is a plan view of a portion of another example of the liquid discharge device 440.

The liquid discharge device 440 includes a housing, the main scan moving unit 493, the carriage 403, and the head 404 among components of the liquid discharge apparatus 1000. The left-side plate 491A, the right-side plate 491B, and the rear-side plate 491C configure the housing.

The liquid discharge device 440 may be configured to further attach at least one of the above-described maintenance unit 420 and the supply unit 494 to, for example, the right-side plate 491B of the liquid discharge device 440.

Next, still another example of the liquid discharge device 440 according to the present disclosure is described with reference to FIG. 11.

Figure 11:
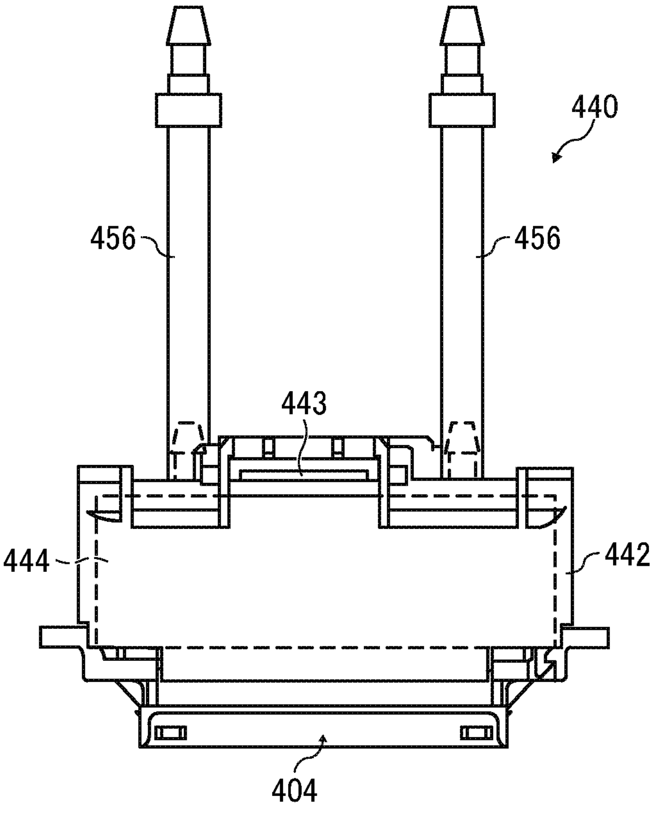
FIG. 11 is a schematic view of a liquid discharge device according to another embodiment of the present disclosure.

FIG. 11 is a front view of still another example of the liquid discharge device 440.

The liquid discharge device 440 includes the head 404 to which a channel part 444 is mounted and a tube 456 connected to the channel part 444.

Further, the channel part 444 is disposed inside a cover 442. Instead of the channel part 444, the liquid discharge device 440 may include the head tank 441. A connector 443 electrically connected with the head 404 is provided on an upper part of the channel part 444.

In the above-described embodiments, the "liquid discharge apparatus" includes the head or the liquid discharge device and drives the head to discharge a liquid. The liquid discharge apparatus may be, for example, an apparatus capable of discharging liquid to a material onto which liquid can adhere and an apparatus to discharge liquid toward gas or into liquid.

The "liquid discharge apparatus" may include devices to feed, convey, and discharge the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless particularly limited.

Examples of the "material on which liquid can adhere" include any materials on which liquid can adhere even temporarily, such as paper, thread, fiber, fabric, leather, metal, plastic, glass, wood, ceramic, construction materials (e.g., wallpaper or floor material), and cloth textile.

Examples of the "liquid" include ink, treatment liquid, DNA sample, resist, pattern material, binder, fabrication liquid, and solution or liquid dispersion containing amino acid, protein, or calcium.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet surface to coat the sheet surface with the treatment liquid to reform the sheet surface and an injection granulation apparatus to discharge a composition liquid including a raw material dispersed in a solution from a nozzle to mold particles of the raw material.

The "liquid discharge device" is an assembly of parts relating to liquid discharge. The term "liquid discharge device" represents a structure including the head and a functional part(s) or mechanism combined to the head to form a single unit.

For example, the "liquid discharge device" includes a combination of the head with at least one of a head tank, a carriage, a supply unit, a maintenance unit, and a main scan moving unit to form a single unit.

Here, examples of the "single unit" include a combination in which the head and a functional part(s) or unit(s) are secured to each other through, e.g., fastening, bonding, or engaging, and a combination in which one of the head and a functional part(s) or unit(s) is movably held by another.

Further, the head, the functional parts, and the mechanism may be configured to be detachable from each other.

For example, as a liquid discharge device, there is a liquid discharge device in which the head 404 and the head tank 441 form a single unit, as in the liquid discharge device 440 illustrated in FIG. 9.

Alternatively, the head 404 and the head tank 441 coupled (connected) with a tube or the like may form the liquid discharge device as a single unit. A unit including a filter may be added at a position between the head tank 441 and the head 404 of the liquid discharge device.

In another example, the head and the carriage may form the liquid discharge device as a single unit.

In still another example, the liquid discharge device includes the head movably held by a guide that forms part of a main scan moving unit, so that the head and the main scan moving unit form a single unit.

Like the liquid discharge device 440 illustrated in FIG. 10, the head 404, the carriage 403, and the main scan moving unit 493 may form the liquid discharge device 440 as a single unit.

In still another example, a cap that forms a part of the maintenance unit may be secured to the carriage mounting the head so that the head, the carriage, and the maintenance unit form a single unit to form the liquid discharge device.

Like the liquid discharge device 440 illustrated in FIG. 11, the tube 456 is connected to the head 404 mounting the head tank 441 or the channel part 444 so that the head 404 and the supply unit 494 (channel part 444, for example) form a single unit as the liquid discharge device 440.

The main scan moving unit may be a guide only. The supply unit may be a tube(s) only or a loading unit only.

The pressure generator used in the "head" is not limited to a particular-type of pressure generator.

The pressure generator is not limited to the piezoelectric actuator (or a laminated-type piezoelectric element) described in the above-described embodiments, and may be, for example, a thermal actuator that employs a thermoelectric transducer element, such as a thermal resistor, or an electrostatic actuator including a diaphragm and opposed electrodes.

The terms "image formation", "recording", "printing", "image printing", and "fabricating" used herein may be used synonymously with each other.

As described above, the had according to the present embodiment can reduce transmission of the vibration generated by the piezoelectric body to the other nozzles.

[Aspect 1]

A liquid discharge head (100) includes: a diaphragm (3) having a nozzle (4); a substrate (2) including a pressure chamber (6) communicating with the nozzle (4); a piezoelectric body (22) over the diaphragm (3), the piezoelectric body configured to deform at least a part of the edge of the nozzle (4); and a vibration absorbing portion (30) in the diaphragm (3).

[Aspect 2]

The liquid discharge head (100) according to aspect 1, wherein, the diaphragm (3) includes: a first diaphragm portion (3*a*) facing the pressure chamber (6); and a second diaphragm portion (3*b*) not facing the pressure chamber (6), and the vibration absorbing portion (30) is in the second diaphragm portion (3*b*) of the diaphragm (3).

[Aspect 3]

The liquid discharge head (100) according to aspect 2, wherein the vibration absorbing portion (30) has a shape of a ring around the nozzle (4) in a plan view of the diaphragm (3).

[Aspect 4]

The liquid discharge head (100) according to aspect 3, wherein the piezoelectric body (22) has a shape of a ring around the nozzle and is in a region at which the pressure chamber is disposed, in a plan view of the diaphragm (3), and the vibration absorbing portion (30) is concentrically disposed outside the piezoelectric body (22) in a plan view of the diaphragm (3).

[Aspect 5]

The liquid discharge head (100) according to aspect 1, wherein a thickness of the vibration absorbing portion (30) in the diaphragm (3) is smaller than a thickness of the diaphragm (3) around the vibration absorbing portion (30).

[Aspect 6]

The liquid discharge head (100) according to aspect 1, wherein a part of the diaphragm (3) is recessed toward the substrate (2) to form the vibration absorbing portion (30).

[Aspect 7]

The liquid discharge head (100) according to aspect 1, wherein a part of the diaphragm (3) is recessed in a direction opposite to the substrate (2) to form the vibration absorbing portion (30)

[Aspect 8]

The liquid discharge head (100) according to aspect 1, wherein the vibration absorbing portion (30) is a hole (102, 103) in the diaphragm (3).

[Aspect 9]

The liquid discharge head (100) according to aspect 8, wherein a thickness at a portion of the substrate (2) facing the vibration absorbing portion (30) is smaller than a thickness at a portion of the substrate (2) not facing the vibration absorbing portion (30).

[Aspect 10]

The liquid discharge head (100) according to aspect 1, wherein the nozzle (4) includes multiple nozzles (4), and the vibration absorbing portion (30) is disposed between the nozzles (4) adjacent to each other.

[Aspect 11]

The liquid discharge head (100) according to aspect 10, wherein the vibration absorbing portion (30) has an elliptical shape.

[Aspect 12]

The liquid discharge head (100) according to aspect 2, wherein the first diaphragm portion (3*a*) is not bonded to the substrate (2); and the second diaphragm portion (3*b*) is bonded to the substrate (2).

[Aspect 13]

A liquid discharge head (100) includes: a diaphragm (3) having a nozzle (4); a substrate (2) bonded to the diaphragm (3) with adhesive (51), the substrate including a pressure chamber (6) communicating with the nozzle (4); a piezoelectric body (22) over the diaphragm (3), the piezoelectric body configured to deform at least a part of the edge of the nozzle (4); and a vibration absorbing portion (30) between the diaphragm (3) and the substrate (2), the vibration absorbing portion (30) being a void space.

[Aspect 14]

A liquid discharge device (440) includes the liquid discharge head (100) according to aspect 1.

[Aspect 15]

The liquid discharge device (440) according to aspect 14, further includes: the liquid discharge head (100) combined with at least one of: a head tank (441) configured to store a liquid to be supplied to the liquid discharge head (100); a carriage (403) configured to mount the liquid discharge head (100); a supply unit (494) configured to supply the liquid to the liquid discharge head (100); a maintenance unit (420) configured to maintain the liquid discharge head (100); and a main scan moving unit (493) configured to move the liquid discharge head (100) in a main scanning direction.

[Aspect 16]

A liquid discharge apparatus (1000) includes the liquid discharge device (440) according to aspect 14.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a diaphragm having a nozzle;

a substrate including a pressure chamber communicating with the nozzle;

a piezoelectric body over the diaphragm, the piezoelectric body configured to deform at least a part of an edge of the nozzle; and a vibration absorbing portion in the diaphragm, wherein a part of the diaphragm is recessed toward the substrate to form the vibration absorbing portion.

2. The liquid discharge head according to claim 1, wherein the diaphragm includes:

a first diaphragm portion facing the pressure chamber; and a second diaphragm portion not facing the pressure chamber, and wherein the vibration absorbing portion is in the second diaphragm portion of the diaphragm.

3. The liquid discharge head according to claim 2, wherein the vibration absorbing portion has a shape of a ring around the nozzle in a plan view of the diaphragm.

4. The liquid discharge head according to claim 2, wherein:

the first diaphragm portion is not bonded to the substrate; and the second diaphragm portion is bonded to the substrate.

5. The liquid discharge head according to claim 3, wherein:

the piezoelectric body has a shape of a ring around the nozzle and is in a region at which the pressure chamber is disposed, in a plan view of the diaphragm, and the vibration absorbing portion is concentrically disposed outside the piezoelectric body in a plan view of the diaphragm.

6. The liquid discharge head according to claim 1, wherein a thickness of the vibration absorbing portion in the diaphragm is smaller than a thickness of the diaphragm around the vibration absorbing portion.

7. The liquid discharge head according to claim 1, wherein the vibration absorbing portion is a hole in the diaphragm.

8. The liquid discharge head according to claim 1, wherein:

the nozzle includes multiple nozzles, and the vibration absorbing portion is disposed between the nozzles adjacent to each other.

9. The liquid discharge head according to claim 8, wherein the vibration absorbing portion has an elliptical shape.

10. A liquid discharge device comprising the liquid discharge head according to claim 1.

11. The liquid discharge device according to claim 10, further comprising:

the liquid discharge head combined with at least one of;

a head tank configured to store a liquid to be supplied to the liquid discharge head;

a carriage configured to mount the liquid discharge head;

a supply unit configured to supply the liquid to the liquid discharge head;

a maintenance unit configured to maintain the liquid discharge head; and a main scan moving unit configured to move the liquid discharge head in a main scanning direction.

12. A liquid discharge apparatus comprising the liquid discharge device according to claim 10.

13. A liquid discharge head, comprising:

a diaphragm having a nozzle;

a substrate including a pressure chamber communicating with the nozzle;

a piezoelectric body over the diaphragm, the piezoelectric body configured to deform at least a part of an edge of the nozzle; and a vibration absorbing portion in the diaphragm, wherein a part of the diaphragm is recessed in a direction opposite to the substrate to form the vibration absorbing portion.

14. The liquid discharge head according to claim 13, wherein the diaphragm includes:

a first diaphragm portion facing the pressure chamber; and a second diaphragm portion not facing the pressure chamber, and wherein the vibration absorbing portion is in the second diaphragm portion of the diaphragm.

15. The liquid discharge head according to claim 13, wherein a thickness of the vibration absorbing portion in the diaphragm is smaller than a thickness of the diaphragm around the vibration absorbing portion.

16. The liquid discharge head according to claim 13, wherein the nozzle includes multiple nozzles, and the vibration absorbing portion is disposed between the nozzles adjacent to each other.

17. A liquid discharge device comprising the liquid discharge head according to claim 13.

18. A liquid discharge apparatus comprising the liquid discharge device according to claim 17.

19. A liquid discharge head comprising:

a diaphragm having a nozzle;

a substrate including a pressure chamber communicating with the nozzle;

a piezoelectric body over the diaphragm, the piezoelectric body configured to deform at least a part of an edge of the nozzle; and a vibration absorbing portion in the diaphragm, wherein the vibration absorbing portion is a hole in the diaphragm, and wherein a thickness at a portion of the substrate facing the vibration absorbing portion is smaller than a thickness at a portion of the substrate not facing the vibration absorbing portion.

* * * * *